United States Patent [19]

Koshiyouji et al.

[11] Patent Number: 5,079,635
[45] Date of Patent: Jan. 7, 1992

[54] LINE SENSOR APPARATUS

[75] Inventors: Takashi Koshiyouji, Yokohama; Teruhiko Uno, Mitaka; Shuuji Kizu, Yokohama, all of Japan

[73] Assignee: Kabushiki Kaisha Toshiba, Kawasaki, Japan

[21] Appl. No.: 540,224

[22] Filed: Jun. 19, 1990

[30] Foreign Application Priority Data

Jun. 23, 1989 [JP] Japan .................................. 1-162226

[51] Int. Cl.$^5$ ............................................ H04N 5/335
[52] U.S. Cl. ................................ 358/213.16; 357/81; 250/238
[58] Field of Search ................. 358/213.16, 213.15; 250/238, 208.1; 357/81

[56] References Cited

U.S. PATENT DOCUMENTS

| 3,227,885 | 1/1966 | Hirai et al. | 250/238 |
| 4,670,795 | 6/1987 | Yamanishi | 358/296 |
| 4,783,700 | 11/1988 | Nagane | 358/213.11 |
| 4,803,561 | 2/1989 | Kubota | 358/285 |
| 4,893,196 | 1/1990 | Koshiyouji et al. | 358/474 |
| 4,926,227 | 5/1990 | Jensen | 357/28 |
| 4,926,242 | 5/1990 | Itoh et al. | 357/81 |

Primary Examiner—Leo H. Boudreau
Assistant Examiner—Steven P. Klocinski
Attorney, Agent, or Firm—Finnegan, Henderson, Farabow, Garrett, and Dunner

[57] ABSTRACT

A line sensor apparatus is adapted to read a character or pattern image on a document. In this apparatus, an illumination device for illuminating the document, a optical lens for focusing the light beam reflected by the document, a CCD line reading sensor for photoelectrically converting the light beam focused by the optical lens into an electric signal, and a holding member for holding the CCD line sensor and the optical lens are assembled as one body in such a manner as to constitute a carriage device. A uniformly radiated heat-radiating plate is in contact with the entire botttom surface of a support for the CCD line sensor, so that the heat generated by the CCD line sensor is radiated from the heat-radiating plate. Further, the CCD line sensor is kept in tight contact with the holding member, so that the heat generated by the CCD line sensor is also radiated from the holding member.

6 Claims, 4 Drawing Sheets

LINE SENSOR APPARATUS

BACKGROUND OF THE INVENTION

1. Field of the Invention

The present invention relates to an image-reading apparatus for reading a character or pattern image on a document, and more particularly to a line sensor apparatus which supplies image data to an image processor connected to a computer or the like, or which is incorporated in a facsimile machine.

2. Description of the Related Art

In general, an image-reading apparatus for reading a character or pattern image comprises: a document table on which a document having a character or pattern is mounted; and a carriage device movable in parallel to the document table and elongated in the main scanning direction, i.e., a first direction, which can read the image portion within a given document region linearly extending along the main scanning direction on the document. The carriage device contains the following structural components: an illumination device for illuminating a document; a focusing device for focusing the light beam reflected by the document on a predetermined position; and a conversion device, which includes a CCD line reading sensor or a photoelectric conversion element, for converting the reflected light beam focused by the focusing device into an electric signal. These structural components are integrally assembled as one unit. The image-reading apparatus is provided with a driving device for moving either the document table or the carriage device in an auxiliary scanning direction perpendicular to the main scanning direction, so as to successively read the image portions o the document through the document region.

The image-reading apparatus reads an image as follows. First of all, a document is placed on the document table, with the image-shown side facing the carriage device. Then, the document is illuminated with the light-rays emitted from the illumination device of the carriage device. The light beam reflected by the document, i.e., information representing the character or pattern image shown in the document, is focused on the CCD line reading sensor by the focusing device of the carriage device. Thus, the reflected light beam is converted into a electric signal. In this manner, the image portion within the given document region is read in the main scanning direction. Next, the carriage device is shifted in parallel to the fixed document table; alternatively, the document table is shifted in parallel to the fixed carriage device. In this condition, the image portion within the document region is read in a similar manner to that mentioned above. With the above operations repeated, all character or pattern image portions shown on the document are sequentially read from the rectangular region. The electric signals produced by the reading sensor are supplied to a memory or an image processor as image information signals, so as to enable the image to be reproduced or processed.

U.S. Pat. No. 4,670,795 discloses a color image forming apparatus employing a plurality of photoelectric converters or CCD sensor elements. These converters are arranged in two or more rows, and a color-separation filter is provided for each converter. The color image on a document is partly read by one row of the converters arranged in one row, and is then partly read by the another row of the converter.

In the CCD line sensor, a dark current peculiar to the sensor is produced and outputted as part of an output signal even when the sensor does not read image information, i.e., when no external light-rays is incident on the sensor.

The intensity of the dark current varies with time, due to the heat which is produced from a component such as a light source and applied to the sensor or due to the heat which the sensor generates in accordance with a driving current supplied thereto. Since the sensor is elongated in the main scanning direction, the distribution of heat in the longitudinal direction of the sensor may not be uniform; it is locally different in accordance with the structure in which the sensor is fixed. Therefore, the magnitude of an output electric signal obtained in accordance with the image information of the document varies in accordance with the variation in the dark current due to the distribution of heat in the longitudinal direction of the sensor. It should be noted that the electrical correction circuit for correcting the output signal depending on the heat distribution and variation can not easily be designed.

The above U.S. Pat. No. 4,670,795 discloses the use of a plurality of converters, but does not mention any problems concerning heat radiation and how such converters should be operated in a stable condition.

SUMMARY OF THE INVENTION

Accordingly, one object of the present invention is to provide a line sensor apparatus for reading a character or pattern image on a document with high reading accuracy.

Another object of the present invention is to provide a line sensor apparatus which can constantly convert image information of a document into an electric signal under the same condition by eliminating the adverse effects arising from a temperature variation of the sensor or the locally-different distribution of heat in the sensor.

To achieve these objects, the present invention provides a line sensor apparatus utilizing a light source, comprising: means for focusing light from the light source into an elongated light beam; means for converting the focused light beam into electric signals, the converting means generating heat; means for supporting the converting means to receive the focused light beam and conductive means for dissipating the heat generated from the converting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

One embodiment of the present invention will now be described, with reference to the accompanying drawings.

Figure 1:
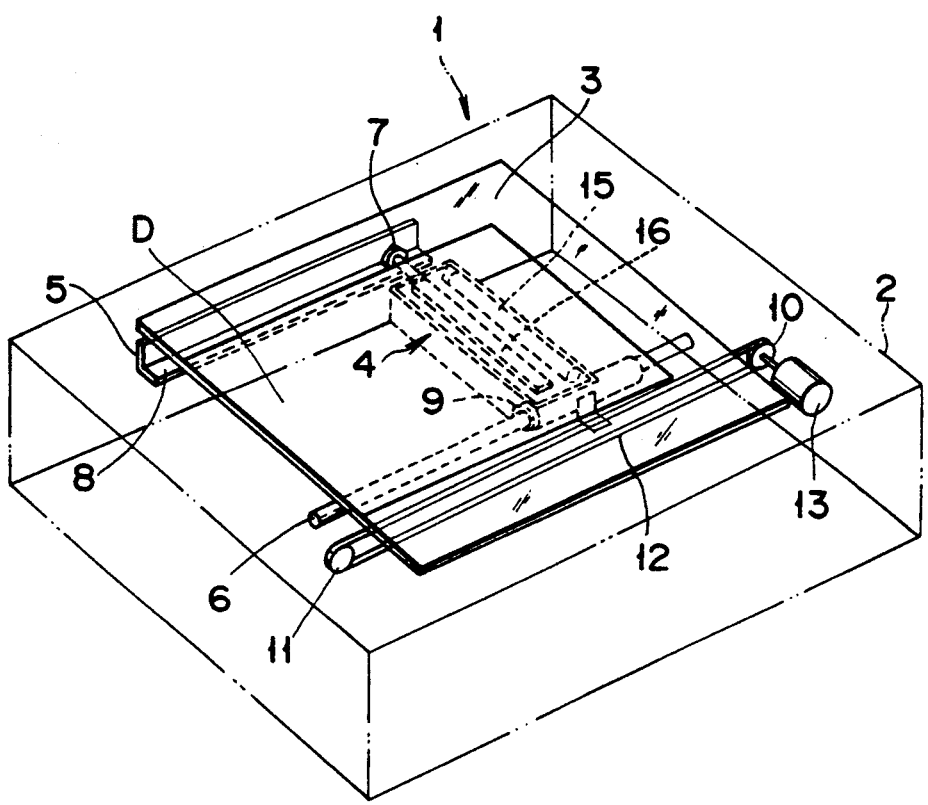
FIG. 1 is a schematic illustration of an image-reading apparatus according to one embodiment of the present invention, the image-reading apparatus incorporating a line sensor apparatus and adapted to read a character or pattern image on a document.

First, the outline of an image-reading apparatus of the present invention will be described. Referring to FIG. 1, the image-reading apparatus 1 for reading a character or pattern image on a document comprises a box-like casing 2 which contains devices and units to be mentioned later. A document table 3 on which a document D is mounted is arranged on top of the casing 2. A pair of carriage-supporting members 5 and 6, which movably supports a carriage device 4 are located under the document table 3. The carriage-supporting members 5 and 6 are respectively attached to the two opposite side walls of the casing 2, e.g. to the front and rear side walls of the casing 2, such that they extend in parallel to each other. One of the carriage-supporting members 5 and 6, e.g. the front one 5, is formed like a plate or "L" shaped plate, and has a guide surface 8. This guide surface 8 supports a guide roller 7 at one end of the carriage device 4 such that the guide roller 7 can roll along the guide surface 8. The other one of the carriage-supporting members 5 and 6, e.g., the rear one 6, is formed like a rod and extends through a slide hole 9 formed at the other end of the carriage device 4.

The carriage device 4 is prevented from vibrating lengthwise, i.e., in the main scanning direction, by the rear one 6 of the carriage-supporting members, and is permitted to move in the auxiliary scanning direction by the guide roller 7 rolling along the guide surface 8 of the carriage-supporting member 5. The carriage device 4 is connected to a driving mechanism provided for the carriage-supporting member 6. More specifically, it is connected to a tooth belt 12 wound around toothed pulleys 10 and 11. The tooth belt 12 is driven by a motor 13, so that the carriage device 4 is moved at the predetermined speed in the auxiliary scanning direction.

Figure 2:
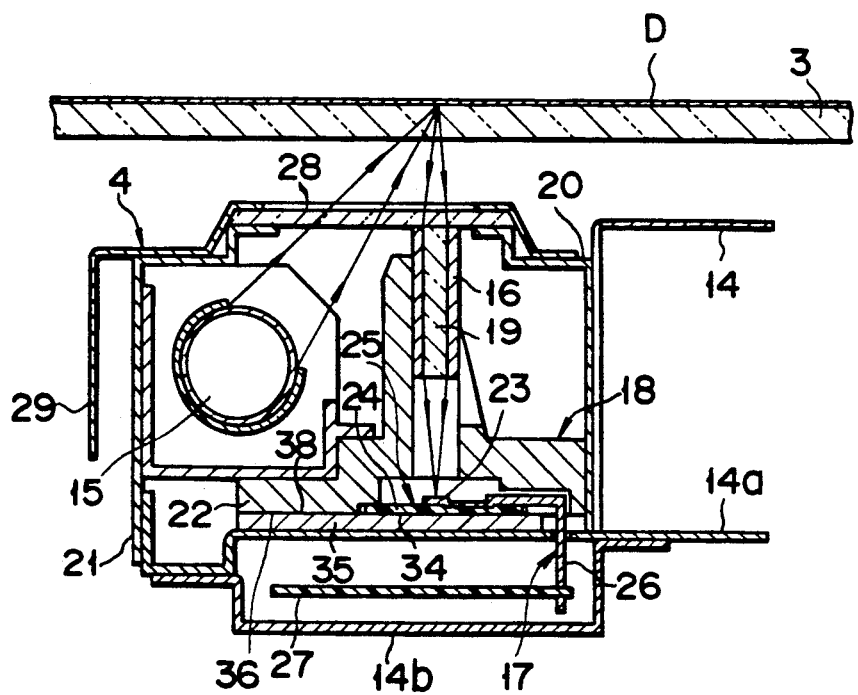
FIG. 2 is a sectional view of a central portion of the carriage device incorporated in the image-reading apparatus shown in FIG. 1, a carriage device being elongated in a main scanning direction.
Figure 3:
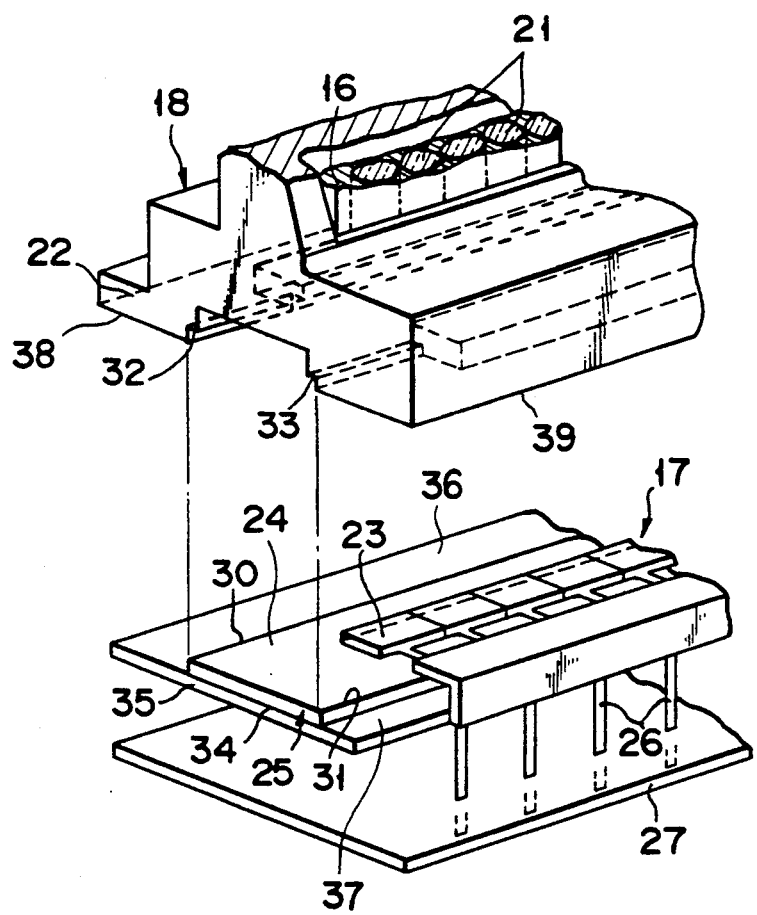
FIG. 3 is a schematic illustration showing how line sensor apparatus and a heat-radiating plate are attached to the carriage device shown in FIG. 2.

FIGS. 2 and 3 illustrate a detailed construction of the carriage device incorporated in the image-reading apparatus shown in FIG. 1. Referring to FIG. 2, the carriage device 4 comprises a base frame 14 made up of an upper frame 14a and a lower frame 14b. An illumination device 15, a focusing device 16, a photoelectric conversion device 17, and a lens-holding member 18 for integrally holding the devices 15–17 are arranged on the upper frame 14a. The lens-holding member 18 is elongated in the main scanning direction and is formed of a material having a large coefficient of thermal conductivity, such as aluminum. The lower frame 14b serves to improve the mechanical strength of the carriage device 4, and the guide roller 7, the slide hole 9, etc. are arranged on the lower frame 14b.

The illumination device 15 is elongated in the longitudinal direction of the lens-holding member 18 and illuminates the document D mounted on the document table 3. The focusing device 16 is a lens array made up of mono-focus rod lenses 19 each having a short focal length. These rod lenses 19 are arranged in one or more rows and are molded to form the lens array 16. Such a lens array is commercially available from Nippon Sheet Glass Co., Ltd. in the trade name of a Selfoc Lens Array (SLA). The illumination device 15 and the lens array 16 are supported by the lens-holding member 18 such that they are substantially parallel to each other. On the respective sides of the lens-holding member 18, side frames 20 and 21 are arranged to keep the above devices or units in a sealed condition. A CCD line sensor 17, which converts image information guided to the lens array 16 into an electric signal, is held at the bottom 22 of the lens-holding member 18.

The CCD sensor 17 is made up of a sensor section 25, leads 26, and a connection plate 27. In the sensor section 25, light-receiving elements 23, each having a substantially rectangular shape whose one side is several tens of $\mu m$, are mounted on an insulating member 24 formed of ceramics or the like and are arranged in one or more rows. The leads are connected at one end to the light-receiving elements 23 to pick up the electric signals output from the light-receiving elements 23. The connection plate 27 has a connection electrode or terminal (not shown) to which the leads 26 are connected at the other end. A voltage for driving the CCD sensor 17 and/or control signals is supplied to the connection electrode or terminal. A second side frame 21 is arranged to face the first side frame 20, and is assembled together with the lens-holding member 18. The second side frame 21 extends along the illumination device 15, so as to prevent dust from entering the carriage device 4 and to prevent a light beam from undesirably falling on the lens array 16 and the CCD line sensor 17. The second side frame 21 supports a transparent dust-prevention plate 28, which is made of glass or plastic, etc., in cooperation with the first side frame 20, such that the plate 28 is located above the lens array 16 and prevents dust from entering the lens array 16. A cover 29, which covers the outside of the carriage device 4, i.e., the outside of the first and second side frames 20 and 21, presses the dust-prevention plate 28 against the first and second side frames 20 and 21, whereby the plate 28 is fixed.

Referring to FIG. 3, a detailed description will be given as to how the lens-holding member 18 is fixed to the CCD line sensor 17. The lens-holding member 18 has reference faces 32 and 33 in the bottom 22 thereof. The first and second edge portions 30 and 31 of the CCD line sensor 17 can be fitted on the reference faces 32 and 33 of the lens-holding member 18, respectively. With this construction, the CCD line sensor 17 is first inserted in the bottom 22 of the lens-holding member 18 and is then pressed against the reference faces 32 and 33 by means of a spring member (not shown) or the like. In this way, the CCD line sensor 17 can be easily and accurately fixed at the focal point of the lens array 16.

In other words, the leads 26 extending in the main scanning direction are located at one end of the CCD sensor 17 or at the side of the second edge 31 of the CCD sensor 17. Due to the presence of the leads 26, the holding member 18 and the sensor section 25 cannot be arranged in tight close to each other. Therefore, the heat caused by a dark current, which is generated in the sensor 17 and output therefrom even when the sensor 17 reads no image information or receives no external light, may not be uniformly radiated. If the heat cannot be uniformly radiated, locally-different heat distribution is produced in the longitudinal direction of the CCD line sensor 17. As a result, the dark current is likely to vary.

As an alternative, the heat-radiating plate 35 extends along the bottom surface 34 of the CCD line sensor 17. Like the lens-holding member 18, this heat-radiating plate 35 is formed of a metal having a large coefficient of heat conductivity. For example, it is formed of aluminum or phosphor bronze. It is attached to the bottom surface 34 of the CCD line sensor 17, with a thin layer of e.g. silicone grease (not shown) interposed. The heat-radiating plate 35 includes dissipating faces 36 and 37, each of which has a comparatively large area. The dissipating faces 36 and 37 are pressed against the bottom faces 38 and 39 of the lens-holding member 18 with uniform pressure, in a similar way in which the CCD line sensor 17 is fixed. The heat arising from a dark current is guided from the CCD line sensor 17 to the heat-radiating plate 35 through the interposed thin layer, and is then radiated from the plate 35 and lens-holding member 18. Since, in this manner, the heat is uniformly radiated from the CCD line sensor 17, the heat radiation from the lens-holding member 18 is accelerated. As a result, the variation arising from the dark current and being dependent on the heat of the CCD line sensor 17 can be eliminated.

Figure 4A:
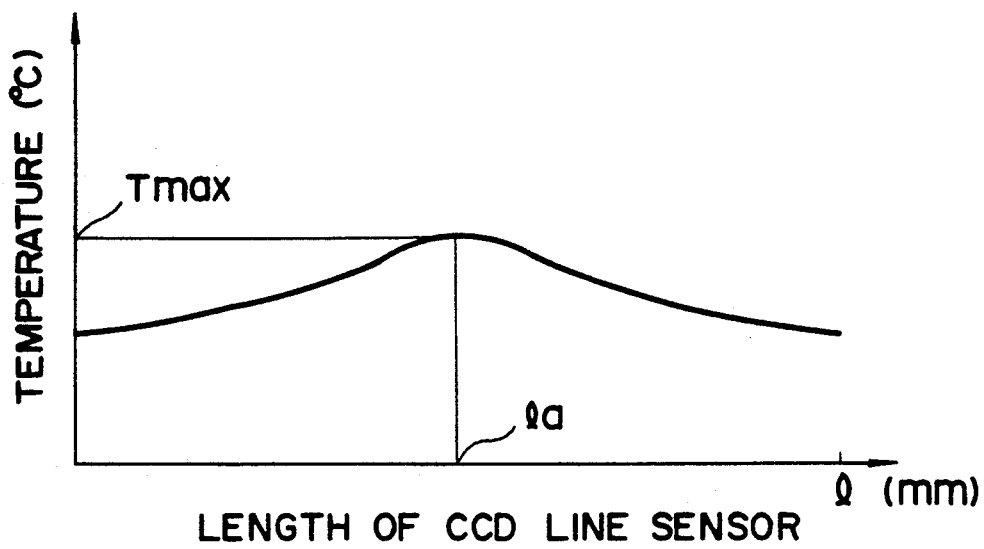
FIG. 4A is a graph showing the distribution of heat in the CCD line sensor.

Due to the elongated construction of the CCD line sensor 17, the heat of the CCD line sensor 17 becomes higher in the central portion than at the end portions, as is well known. In other words, the distribution of heat of the CCD line sensor varies in the longitudinal direction thereof, i.e., in the direction in which the light-receiving elements 23 are arranged (in FIG. 4A and FIG. 4B). As is shown in FIG. 4A, the CCD line sensor 17 and length l, and its central portion, which generates the largest amount of heat, is indicated by la.

Figure 4B:
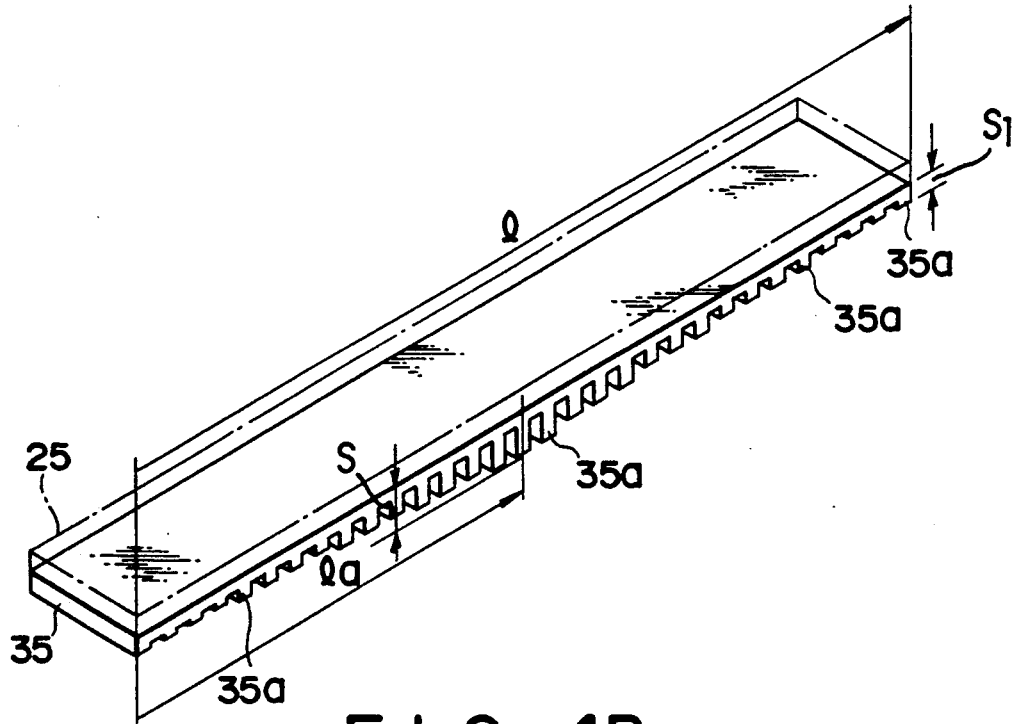
FIG. 4B is a schematic illustration of another embodiment of the heat radiating plate.

If the heat-radiating plate 35 has radiating area, i.e., fins 35a, corresponding to the distribution of heat in the CCD line sensor 17, the heat radiation becomes more uniform. For example, a plurality of heat radiating areas or fins 35a are provided for the CCD line sensor 17, as is shown in FIG. 4B, and the lengths of the fins 35a, i.e., the sizes of the radiating areas, are determined in accordance with the distribution of heat shown in FIG. 4A, for example, such that the length of the fin 35a at the central portion la of the CCD line sensor 17 has the greatest length and length $s_1$ of a fin 35a at end portions thereof is smaller than that (s) of the fin 35a of the central portion. With this structure, the uniform heat radiation is easily achieved.

Accordingly, the image on a document can be read or photoelectrically converted with high accuracy. Similarly, the heat-radiating area of the lens-holding member 18 may be also changed in accordance with the distribution of heat therein, as in the case of the CCD line sensor 17.

Next, a description will be given of the operation of the image-reading apparatus shown in FIGS. 1-3.

First of all, a document D, which is of e.g., the letter size (8.5×11 inches) and has a character or pattern image thereon, is placed on the document table 3, i.e., a transparent glass plate, such the image-shown side of the document D is in contact with the transparent glass plate 3. The document D is illuminated with light beam emitted from the illuminating device 15 of the carriage device 4. The illumination device 15 is a tubular lamp extending in the main scanning direction, i.e., the lengthwise direction of the carriage device 4. The light beam reflected by the document D is partly guided to the lens array 16, i.e., the focusing device, arranged perpendicular to the glass plate 3. The reflected light beam guided to the lens array 16, i.e., light beam representing the character or pattern image shown on the document D, is focused on the CCD line sensor 17, where it is converted into an electric signal. Simultaneous with this conversion, the carriage device 4 is shifted in the auxiliary scanning direction, which is perpendicular to the main scanning direction, at a predetermined constant speed by the motor 13 and the tooth belt 12. In this manner, the image portions within an elongated region are successively read from the document D, and are converted into electric signals by the CCD line sensor 17. The electric signals produced by the CCD line sensor 17 are converted or processed in a predetermined manner by a single-processing circuit (not shown), and are then supplied to a device (not shown), such as a memory device or a printer, which is externally connected to the image-reading apparatus.

As mentioned above, in the image-reading apparatus of the embodiment of the present invention, a heat-radiating member is provided in accordance with the arrangement of the light-receiving elements of the CCD line sensor, so as to permit the heat to be uniformly radiated from the light-receiving elements. As a result of this heat radiation, a variation in the dark current arising from a heat increase of the light-receiving elements and from an increase in the ambient temperature of the light-receiving elements can be suppressed. In addition, the distribution of heat characteristic of the light-receiving elements can be made uniform. Accordingly, the heat-dependent dark current peculiar to the CCD line sensor becomes constant at each portion of the CCD line sensor. Since, therefore, the characteristics of the photoelectric conversion of the CCD line sensor are uniform in the longitudinal direction of the CCD line sensor, the image information can be read in a reliable manner, i.e., it is constantly converted into an electric signal under the same condition. It should be noted that the image-reading apparatus of the present invention does not employ a plurality of heat-detecting mechanisms or an additional device for correcting the magnitude of an electric current. Therefore, the characteristic of the photoelectric conversion of the CCD line sensor can be made uniform without resulting in an increase in the price of the structural components or parts or in an increase in the assembling cost of the structural components or parts. As a result, the image of the document can be constantly converted into an electric signal under the same condition. Thus, it is possible to provide an image-reading apparatus which can read the image of the document with high accuracy and which can be manufactured at a low cost.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

We claim:

1. A line sensor apparatus comprising:

focusing means for focusing a light beam emitted from a light source;

converting means, including a plurality of conversion elements which are arranged along linearly-extending edges of a substrate, for converting the focused light beam into electric signals, the converting means generating heat which has a heat distribution having a peak which is located at a lengthwise central portion of the substrate;

supporting means for supporting the converting means, the supporting means including (a) a plurality of flat surfaces each having a large sectional area, and (b) a heat dissipating member, having heat radiating areas which correspond to the heat distribution, for dissipating the heat generated by the converting means; and holding means for holding the focusing means, the converting means and the supporting means together, the holding means including (a) a plurality of flat surfaces each having a large sectional area and facing a corresponding contact portion of the supporting means, and (b) recess portions corresponding to the edges of the substrate.

2. An apparatus according to claim 1, wherein the heating dissipating member includes a flat area corresponding to said large sectional area for direct contact with said large sectional area to maximize conduction of heat therebetween.

3. An apparatus according to claim 1, wherein the holding means includes a material having a coefficient k of heat conductivity of more than 1.5 W/cm.deg).

4. An apparatus according to claim 1, wherein the supporting means includes a material having a coefficient k of heat conductivity of more than 1.5 W/cm.deg).

5. An apparatus according to claim 1, wherein each of the conversion elements includes a CCD sensor.

6. An apparatus according to claim 1, wherein the focusing means includes a lens array.

* * * * *